United States Patent [19]

Wischermann

[11] Patent Number: 4,623,922
[45] Date of Patent: Nov. 18, 1986

[54] SYSTEM FOR TIME COMPRESSION AND/OR EXPANSION OF ELECTRICAL SIGNALS

[75] Inventor: Gerhard Wischermann, Darmstadt, Fed. Rep. of Germany

[73] Assignee: Robert Bosch GmbH, Stuttgart, Fed. Rep. of Germany

[21] Appl. No.: 530,075

[22] Filed: Sep. 7, 1983

[30] Foreign Application Priority Data

Sep. 8, 1982 [DE] Fed. Rep. of Germany ....... 3233288

[51] Int. Cl.[4] .............................................. H04N 5/14
[52] U.S. Cl. .................................. 358/160; 358/21 R; 358/138; 358/260; 455/72; 370/109; 381/34
[58] Field of Search ............... 358/160, 21 R, 22, 133, 358/138, 141, 260; 340/728; 455/72; 370/109; 375/30; 381/29, 34; 352/84

[56] References Cited

U.S. PATENT DOCUMENTS

| 4,134,128 | 1/1979 | Hurst | 358/160 |
| 4,200,890 | 4/1980 | Inaba et al. | 358/22 |
| 4,302,776 | 11/1981 | Taylor et al. | 358/160 |

Primary Examiner—James J. Groody
Assistant Examiner—Michael D. Parker
Attorney, Agent, or Firm—Michael J. Striker

[57] ABSTRACT

A system for time compression and/or expansion of video signals is disclosed. Samples of the video signals are interpolated, written in a memory and read out of the memory. Clock signals used for writing into and reading from the memory include a continuous pulse sequence and a pulse sequence having the same pulse frequency except that certain pulses are suppressed in accordance with predetermined compression of expansion factors. In this manner a substantially continuous compression or expansion is obtained by using a circuit of relatively simple design.

4 Claims, 9 Drawing Figures

SYSTEM FOR TIME COMPRESSION AND/OR EXPANSION OF ELECTRICAL SIGNALS

BACKGROUND OF THE INVENTION

The present invention relates in general to a system for time compression or expansion of electrical signals, particularly video signals, in which samples of the signals are interpolated and written in a memory at a first clock rate and then read out from the memory at a second clock rate.

In various fields of communications technology, particularly in the television technology, it is frequently desired that processed signals be spread out in time or shortened in time. As known, the signals to be processed in such a manner are first written into a memeory at a first clock frequency and thereafter read out from the memory at a second clock frequency deviating from the first one. Inasmuch as the employed memory is a digital one, it is first necessary to convert the processed analog signals into corresponding digital signals and after their compression or expansion, if desired, the signals are reconverted into analog form. One of the most important applications of time expansion or compression in the field of television technology is the so-called electrical zooming, in which, apart from linear changes of processed magnitudes, also changes in vertical or horizontal direction only, and various distortions of the TV picture, are also possible. Another use of the expansion or compression system is for format modification, for example for the reproduction of cinemascope-type film, standard converters for converting TV signals of numbers of lines and/or picture frequencies.

A system of this kind is known for example from RCA Review, Vol. 42, No. 1, March, 1981, pp. 3–59, in which the compression is achieved by deleting some of the scanned values of a video signal. This method, however, in the case of predetermined sampling frequencies produces interferences in the reproduced image. In another proposal, the above article (page 43 et seq.) describes sampling of the signal to be processed at a frequency which differs from the original sampling frequency. To this end it is necessary to determine the resulting new samples by interpolation. If these new samples are written into a memory and subsequently read out from the memory at the original frequency, then a compression and/or expansion is achieved. The disadvantage of this prior-art method is the necessity to use an additional sampling frequency which differs from that at which the signals were originally sampled. Particularly when using a variable compression and/or expansion factor difficulties will result during the synchronization of individual component parts of the interpolation circuit and of the memory.

SUMMARY OF THE INVENTION

It is therefore a general object of the present invention to overcome the aforementioned disadvantages.

In particular, it is an object of the invention to provide an improved system for time compression and/or expansion of electrical signals whose compression or expansion factor is continuously adjustable within broad limits.

An additional object of this invention is to provide such an improved system which can be realized with minimum additional component parts.

In keeping with these objects and others which will become apparent hereafter, one feature of the invention resides, in a compression or expansion system of the above described kind, in the provision of first clock means for producing a continuous sequence of clock pulses, and second means for producing a discontinuous sequence of clock pulses at the same frequency as said continuous sequence with some pulses having been deleted according to predetermined compression or expansion factors, the first and second clock means being connected to the memory for writing therein the signals according to the continuous clock pulses and for reading the signals from the memory according to the discontinuous clock pulses when expansion factors are used or writing the signals into the memory according to the discontinuous clock pulses and reading the signals from the memory at such a rate as to obtain signals according to the continuous clock pulses when compression factors are used.

The system according to this invention has the important advantage that almost continuous adjustment of the compression or expansion factor is made possible and that the circuit design of the system employs only a single master clock frequency which is independent of of the compression or expansion factors variations.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

For the sake of simplicity, the system of this invention will be first described with reference to FIGS. 1–7, relating to a compression or expansion of video signals.

Figure 1:
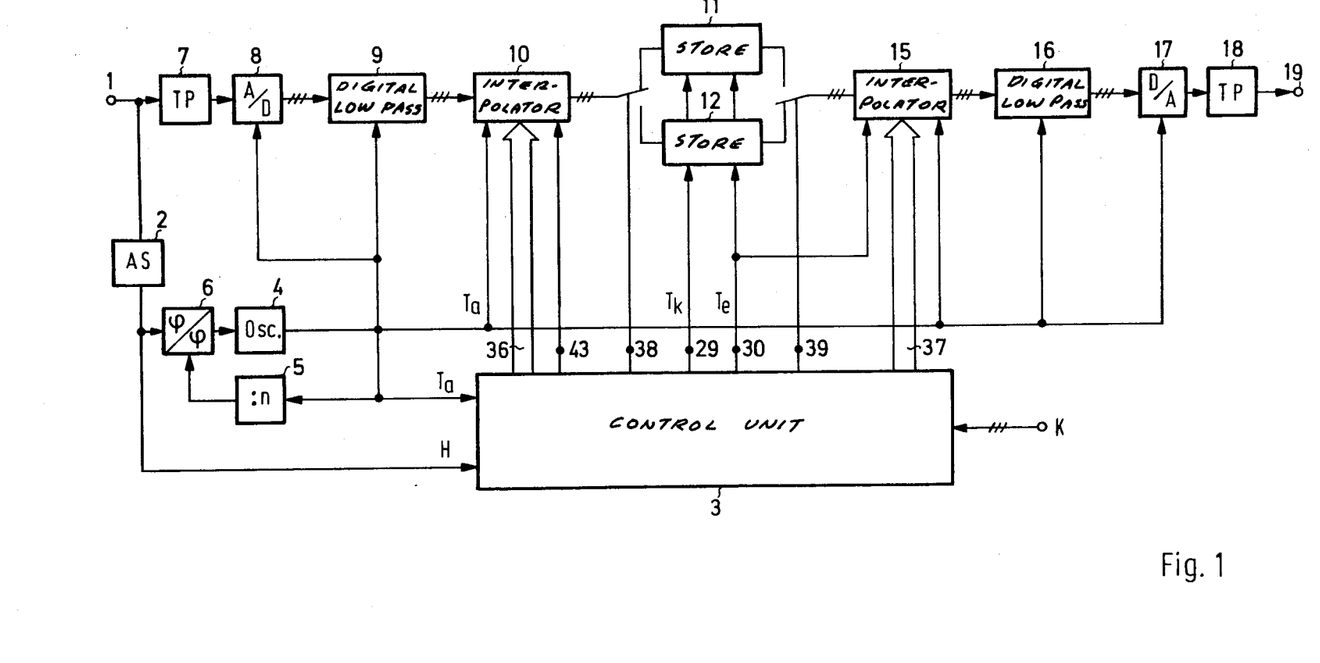
FIG. 1 is a block circuit diagram of the system according to this invention.

In the embodiment of this invention according to FIG. 1, signals to be compressed or expanded are applied to terminal 1. An amplitude separator 2 separates from the input signal horizontal pulse train H and applies the same to control unit 3. In addition, a master clock pulse train $T_a$ is derived from the horizontal pulse train H. The master clock $T_a$ is generated in a controllable oscillator 4 whose output signal is fed via a frequency divider 5 to one input of a phase comparator 6. The other input of the phase comparator is connected to the output of the amplitude separator 2 to receive the horizontal pulse H. The output voltage of the phase comparator 6 controls the frequency of oscillator 4 in such a way that this frequency amounts to a multiple, determined by the frequency divider 5, of the horizontal frequency. The above described circuits are known from prior art (PLL circuits) and in television technology are employed particularly for coupling of subcircuits operating at different frequencies. The resulting master clock signal $T_a$ is also applied to the clock input of an analog/digital converter 8. The signal input of converter 8 is connected via a lowpass filter 7 to the input terminal 1, so that analog signals from this terminal are first limited in bandwidth by the filter 7 and then converted into digital signals. In the case of conventional TV signals, the limit frequency of the lowpass filter is about 5 MHz. Therefore, the frequency of the sampling clock signal $T_a$ must exceed 10 MHz in order to prevent the so-called alias interferences.

The digital signals are fed through a digital lowpass filter 9 whose function will be discribed below, to an input interpolator 10 of a compression/expansion stage 10–15. In order to compress these signals in time, the number of samples applied to the interpolator 10 per time unit corresponds to the frequency of continuous clock signal $T_a$, whereas in reading out from the interpolator 10 a lower number of samples (corresponding to a ratio $T_a/T_k$) per time unit is retrieved at a clock frequency $T_k$. This operation will be described in greater detail below, in connection with FIGS. 2–4. In a memory consisting in this example of line stores 11 and 12 as well as of switches 13 and 14, the output signals from the interpolator 10 are stored at a rate $T_k$ and read out at a higher rate corresponding to the continuous clock frequency $T_a$. In this manner, a time compression is obtained. When the system arrangement according to FIG. 1 operates as a time compressor, then the additional interpolator 15, digital lowpass filter 16 is made inoperative. The time-compressed signals are applied through the digital/analog converter 17 and an analog lowpass filter 18 to the output terminal 19.

In order to keep the interpolator 15 ineffective, the control unit, during the compressing function of the system, applies to the clock input of interpolator 15 timing pulses at a frequency $T_a$. If, however, the system of FIG. 1 is to be employed as a time expander, then a clock signal $T_x$ is applied to both inputs of the interpolator 10, so that the latter becomes ineffective, whereas the other interpolator 15 now operates similarly as the interpolator 10 during the compression.

Regarding the two storing subunits 11 and 12, it will be noted the following. In the system of this invention, the two stores cannot operate independently of one another in the write-in or read-out modes. For this reason, there are provided two stores which, line after line, alternately operate in read-out and write-in mode of operation. The switches 13 and 14 are actuated and controlled by the control unit 3 at half the line frequency. For lower sampling frequencies applied to the interpolators 10 and 15 and to the stores 11 and 12, the scanning theorem has to be taken into consideration. For this purpose there are provided the digital lowpass filters 9 and 16, whose cut-off frequency is adjustable. Suitable lowpass filters of this kind are the so-called Butterworth filters or filters according to German patent application P 31 21 310.

The control unit 3 produces derived clock signals $T_k$ and $T_e$, a signal at a frequency 2H which equals half the line frequency, and also digital signals for designating interpolation coefficients at the interpolators 10 and 15. The control unit 3 will be explained in more detail with reference to FIG. 3.

Figure 2:
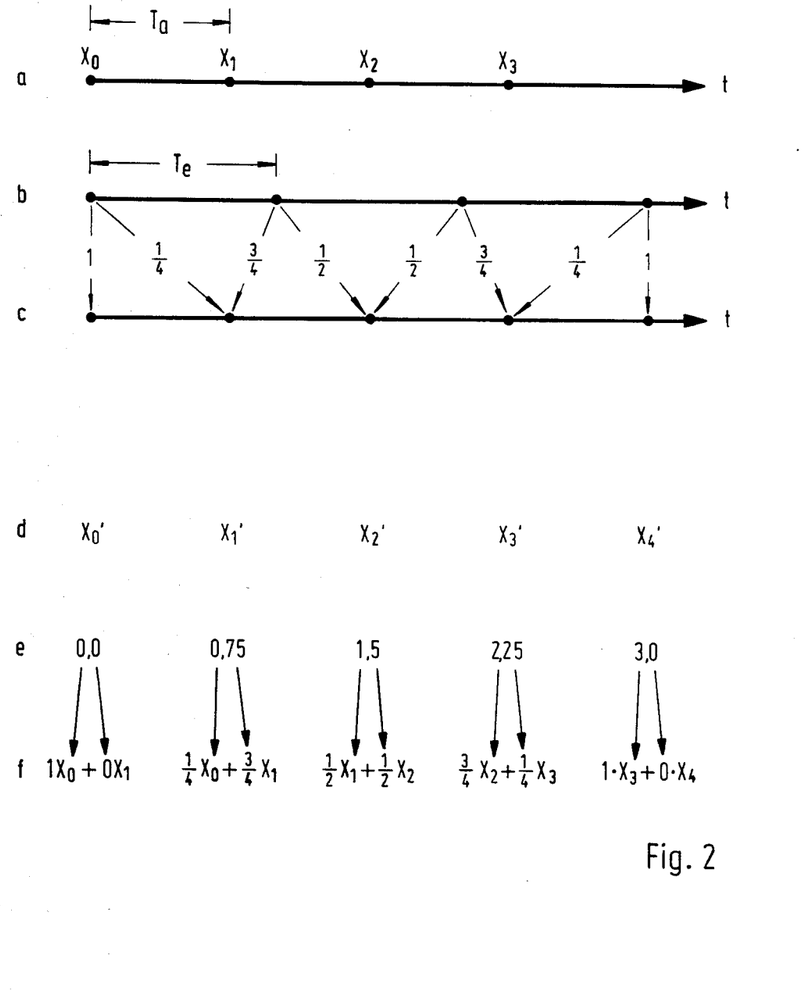
FIG. 2 shows schematically the interpolation of the processed signals in the case of their expansion.

Referring now to FIG. 2, the interpolation of sampled signals for digitial compression or expansion will be described. The time plot in FIG. 2a illustrates the position of several samples $x_0, x_1, x_2, x_3, \ldots$, which are spaced apart at time intervals $T_a$. These samples x will be written into a memory, for example in store 11 of FIG. 1 at the clock rate $T_k = T_a$ and thereafter read out from the memory at a slower rate, so as to achieve an expansion as indicated in FIG. 2b. It is true that the signal according to FIG. 2b is expanded in time; nevertheless, it has a clock frequency $T_e$ which is variable in accordance with variations of the expansion factor but need not be suitable for further processing of the digital signals. Therefore, as shown in FIG. 2c, interpolation values or signals at the output of the compression/expansion stage are produced at the original clock frequency $T_a$. In the shown example a linear interpolation is employed, which assuming that the clock signals $T_e$ and $T_a$ are at a ratio of 3:4, produces coefficients as indicated by arrows between FIGS. 2b and 2c. As will be explained below in connection with FIG. 3, the interpolation coefficients and the requisite addresses for storing the scanned samples in memory, are also produced in the control unit 3. FIGS. 2d–2f illustrate an example of the relation between the coefficients and addresses and samples; the control unit 3 generates a single multi-place digital value whose digits before the decimal point indicate the address and whose digits after the decimal point indicate the interpolation coefficient. The new samples $x_0', x_1', x_2', x_3'$ and $x_4'$ occur simultaneously with the repeated addition of the compression factor K=0.75 and are accumulated in an accumulator, as illustrated in FIG. 2e. When the digits before the decimal point are separated from the digits after the decimal point, then a computation formula shown in FIG. 2f for the interpolated sample $x_0', x_1', \ldots$, is obtained.

Figure 3:
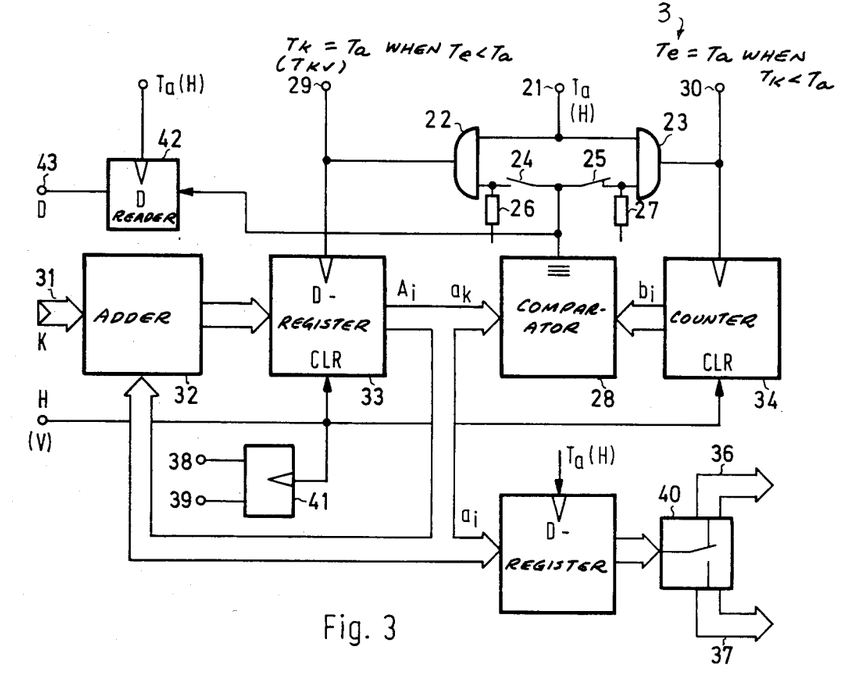
FIG. 3 shows schematic block diagram of essential parts of the control unit of FIG. 1.

FIG. 3 shows essential component parts of a control unit 3 (FIG. 1) serving for the generation of clock pulses $T_e$ and $T_k$ and for generation of interpolation coefficients. Reference characters placed in parentheses denote the application of the control unit for a vertical image compression or image expansion and in the subsequent description will not be considered.

The sampling clock signal $T_a$ is applied via an input terminal 21 to an input of respective AND-gates 22 and 23. The other inputs of the AND-gates are connected via resistors 26, 27 to a source of logic "1", so that when switches 24 or 25 are open the logic "1" appears on the corresponding input of the AND-gate. The switches 24 and 25 are connected to the output of a comparator 28. As a consequence, the clock signal $T_a$ passes through that AND-gate 22 or 23 whose switch 24 or 25 is in an open position. For instance, if switch 24 is open, then clock signal $T_a$ is applied directly to terminal 29, whereas if the other switch 25 is open and the switch 24 is closed then the clock signal $T_a$ is fed to terminal 30. In using the system of this invention for a signal compression, then switch 25 is open and the switch 24 is closed. When the system is used for time expansion of the signals, the switches 24 and 25 are in the positions illustrated in FIG. 3.

The aforementioned compression factor K in the form of a multi-place digit is applied to the control unit of FIG. 3 by a bus 31. If the compression factor K is less than 1, the system of FIG. 1 operates as a time expander; when K is larger than 1, it operates as a time compressor. The compression factor supplied by bus 31 is added in an adder 32 to the sum of all compression factors which were supplied during a time unit, for example within the time period of a video line. The resulting values are fed at a clock frequency $T_k = T_a$ into the D-register 33. The output of the D-register thus supplies the sum $A_i$ of all compression factors, and this sum is fed back to the adder 32 to be added to the next compression factor, and the new sum is again applied during the next clock pulse $T_a$ to the D-register. It will be noted that, in the simplest case, the compression factor K is constant; nevertheless, a time-dependency of the compression factor K can be established in order to obtain non-linear geometrical distortions, for example. From the aforementioned sum Ai an integer part $a_k$, that is the digits before the decimal point, is applied to one input of the comparator 28, whereas the other input of the comparator is supplied with an output signal $b_i$ from a counter 34. As mentioned above, during the expansion mode of operation, the coefficient K is less than 1, but the count of counter 34 increases by 1 at each clock pulse $T_e$, the counter would become out of tune with the accumulator consisting of the adder 32 and the register 33. The integer part $a_k$ of the output signal $A_i$ from the accumulator is smaller than the output signal $b_i$ from the counter 34, and at the output of comparator 28 a logic "0" occurs. Consequently, main clock pulses $T_a$ do not pass to terminal 30 and to the input of counter 34 until the numbers $a_k$ and $b_i$ are equal.

A further D-register 42 clocked by the clock signal $T_a$ delays the output signal of comparator 28 by a sampling period. The delayed signal D is applied to output terminal 43 and therefrom to the interpolator 10.

Figure 4:
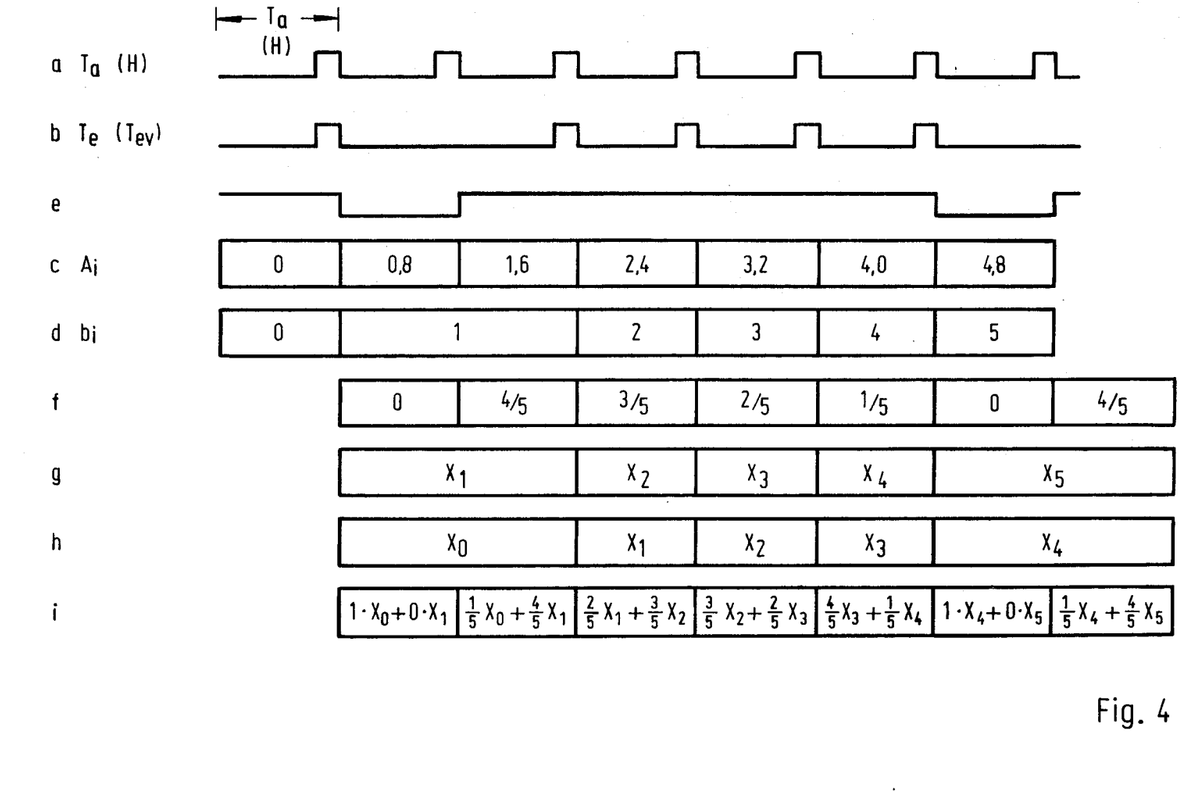
FIG. 4 shows the time sequence of exemplary scanned values during the signal expansion.

The aforedescribed processes are illustrated in the time plot according to FIG. 4. FIG. 4a shows the main clock signal $T_a$, FIG. 4b the derived clock signal $T_e$, FIG. 4c the output signal $A_i$ of the D-register 33, FIG. 4d the output signal $b_i$ from counter 34, and FIG. 4e illustrates the output signal of comparator 28.

At the beginning of a video line, both the D-register 33 and the counter 34 are set to zero by the pulse H which is supplied at a line frequency to an input terminal of control unit 3. The first clock pulse in the diagram of FIG. 4a with the desired expansion factor, in this case 0.8, is entered in the D-register 33. During the first sampling period $T_{a1}$ the contents of the D-register 33 and counter 34 are equal. Consequently, comparator 28 outputs a logic "1" so that clock pulse $T_a$ can pass through AND-gate 23 to terminal 30, where also a pulse in synchronism with $T_e$ will occur. Due to this simultaneous application of two pulses $T_a$ and $T_e$, the counter 34 is set to 1, whereas value 0.8 is written into the D-register 33. As a consequence, uneven data are applied to comparator inputs, and the output of comparator 28 is set to zero. Accordingly, the next clock pulse $T_a$ cannot pass to the point 30 and to the input of counter 34. Hence, the pulse sequence $T_e$ is subject to an interruption. This interruption has the effect that the contents of counter 34 remain at logic "1", whereas the contents of D-register 33 is increased to 1.6. Thereupon, the whole line proportion of signal $A_i$ equals again the signal bi, and a logic "1" is produced at the output of the comparator. The third pulse of the signal $T_a$ (FIG. 4a) therefore is passed again to the terminal point 30, etc. Accordingly, a clock signal $T_e$ is generated which coincides with the rate of the clock signal $T_a$ but, when considered over a prolonged time period, contains a smaller number of samples.

In order to compress the incoming signals, switch 24 is closed and switch 25 is opened, so that clock signal $T_a$ is directly applied to the input of counter 34. In addition, input bus 31 supplies to adder 32 a compression factor K which is larger than 1. The clock signal $T_a$ passes through the AND-gate 22 to the clock input of D-register 33, so that a value K is added in the adder 32 and in the D-register 33 with the occurrence of each clock pulse Ta. Since the factor K in the case of a compression is larger than 1, the contents of D-register 33 run away from the contents of counter 34, and consequently depending on the value of K, $a_k$ more or less frequently differs from $b_i$ and as a result, similarly as in the case of expansion, some pulses drop out in clock signal $T_k$. At this, it may also happen that the portion $a_i$ after decimal point of signal $A_i$ corresponds to the interpolation coefficient which after clocking is applied to an additional D-register 35 and via a switch 40 to one of the outputs 36 or 37. In a compression mode of operation, the switch 40 is in the illustrated upper position, so that the interpolation coefficient is supplied via output 36 to the interpolator 10, whereas coefficient $a_i = 0$ is applied to interpolator 15 via the output 37. In the expansion mode of operation, switch 40 is in its lower position, so that coefficient $a_i$ is supplied to interpolator 15 (FIG. 1) and the interpolator 10 receives a zero value.

The memory of the system can employ stores 11 and 12 from which the stored signal can be read out in the same order as that in which they are written in. This kind of store in general does not require any addresses. On the other hand, addressable memories can also be employed. In this case, a whole-line proportion of signal $A_i$ can be used as an address. In this connection, it will be noted that, in employing addressable memories, it is possible to achieve additional effects such as mirror images, and the like, for example.

The signal represented in FIG. 4f illustrates the interpolation coefficient $a_i$ at the output 37 of the control unit of FIG. 3. It will be seen that this signal corresponds to the portion of the signal $A_i$ (FIG. 4c) after the decimal point. By the action of D-register 35 (FIG. 3) this signal (4f) is shifted to the right by a clock period $T_a$. This interpolation factor as well as a signal to be expanded (illustrated in FIG. 4g) is applied to an interpolator.

Figure 5:
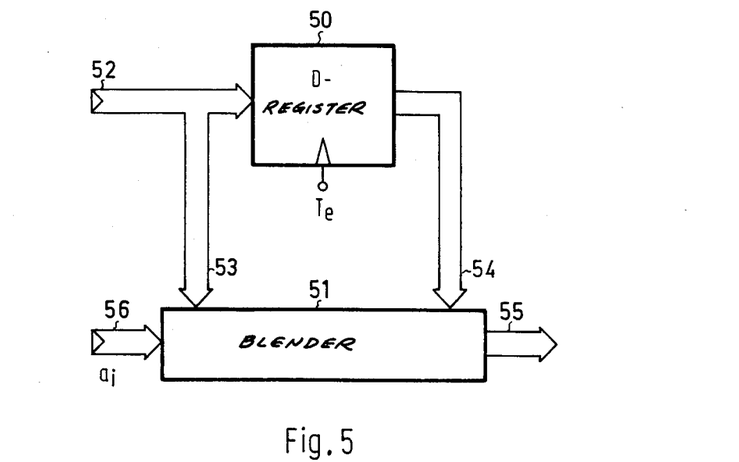
FIG. 5 shows a block diagram of an interpolator of FIG. 1.

FIG. 5 illustrates schematically the interpolator 15 of FIG. 1. It consists of a D-register 50 and a blender unit 51. Signals to be compressed or expanded are applied to the input 52 of the D-register. Signals fed to inputs 53 and 54 of the blender 51 are processed as a function of a signal applied to the control input 56 and are outputed at the output bus 55. In particular, one of the input signals is directly multiplied by a coefficient $a_i$ supplied by the input bus 56, whereas the other input signal is multiplied by $(1-a_i)$. D-register 50 is clocked by the signal $T_e$ picked up at the terminal point 30 (FIG. 3).

FIG. 4g shows signals $x_1$ to $x_5$ read out from the store 11 or 12 at a clock rate $T_e$. The represented mode corresponds to an expansion, inasmuch as, originally, the transmission time for four samples (for example $x_1$ to $x_4$) amounted to four sampling periods $T_a$, whereas the read-out from the memory is within five periods $T_a$. FIG. 4h illustrates samples $x_0$ to $x_4$ delayed by a clock period $T_e$. Blending unit 51 produces at its output signals illustrated in FIG. 4i. These output signals are expanded and have a continuous clock rate.

Figure 6:
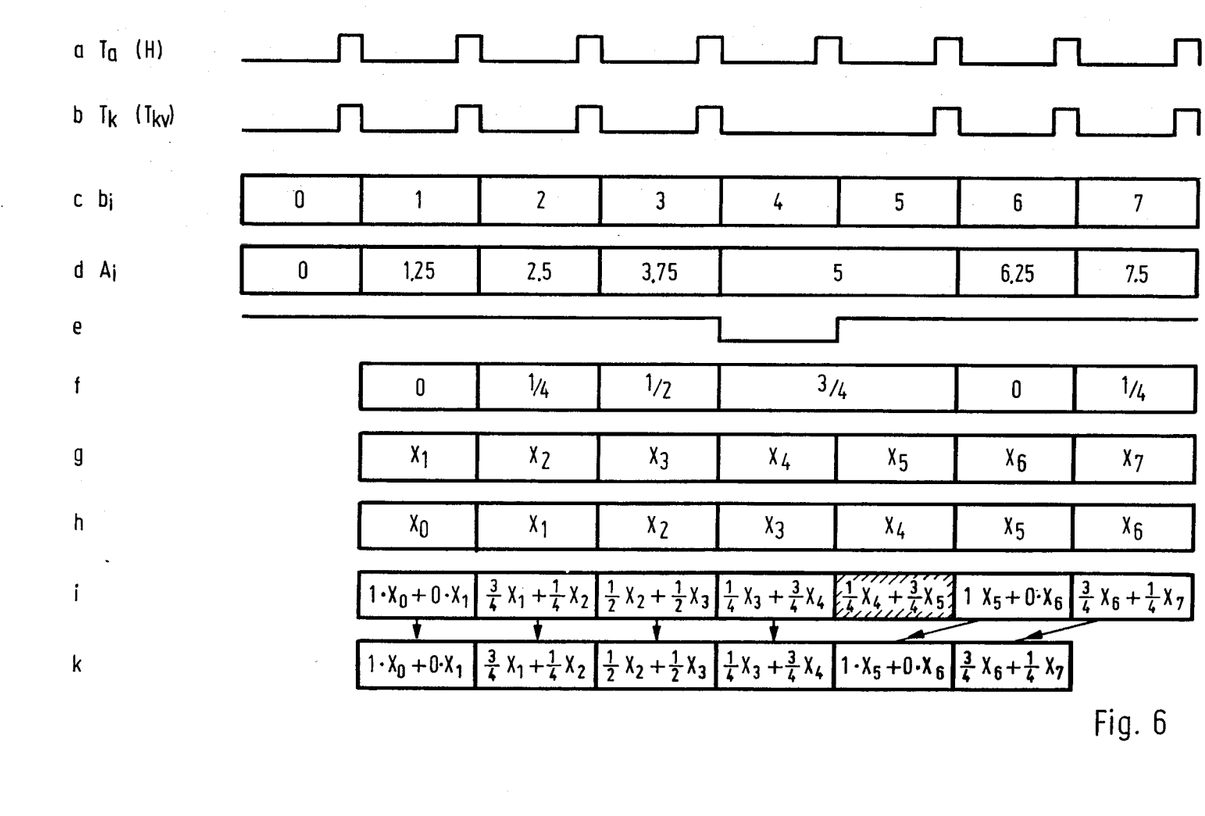
FIG. 6 denotes a time sequence of interpolated values in the case of compression.

FIG. 6 illustrates in time plots similar to FIG. 4 signal processing in the case of a compression. FIG. 6a thus shows again a scanning signal $T_a$, FIG. 6b compression clock $T_k$, FIG. 6c shows the contents of counter 34 (FIG. 3), and FIG. 6d the contents of D-register 33. If, for example, the contents of counter 34 amounts to 4, then due to accumulation of the value 1.25 the D-register 33 has reached the value 5. Consequently, comparator 28 generates a logic "0" at its output (FIG. 6e) so that no clock pulse $T_a$ is applied to the D-register 33. Hence, at the next pulse $T_a$ the D-register 33 remains at a value 5, and only by the subsequent pulse is brought to the value 6.25. The interpolation coefficient $a_i$ resulting at the output of D-register 35 is illustrated in FIG. 6f.

Figure 7:
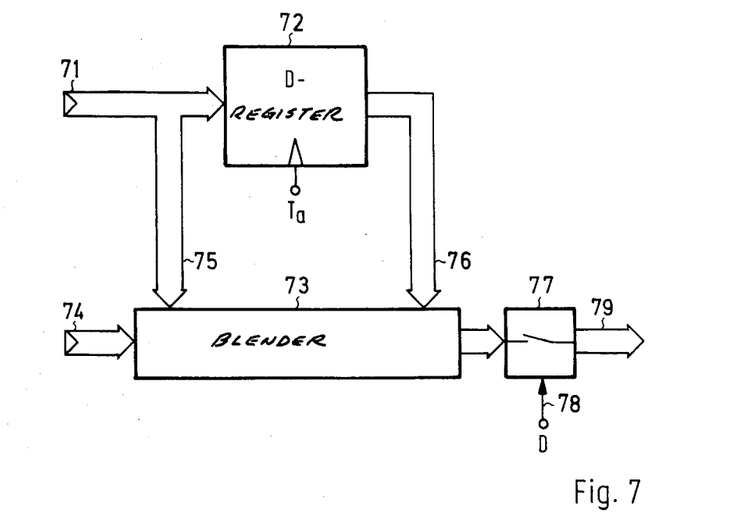
FIG. 7 shows a system diagram of an interpolator for signal compression.

Before discussing further signals shown in FIG. 6, reference is made to FIG. 7, illustrating the interpolator 10 (FIG. 1) for a compressing operation. By arranging the interpolator 10 before the memory (in contrast to interpolator 15 which is arranged after the memory), it is achieved that there is no need for clock signals whose rate is higher than that of the sampling clock signal $T_a$. Inasmuch as the requisite scanning rate for a video signal is by itself considerably high, this measure facilitates the circuit design for the system according to this invention.

Signals to be compressed are applied to an input 71 and are fed to the input of D-register 72, which is triggered by the sampling clock signal $T_a$. Both the input signal from input terminal 71 and the output signal from the D-register 72 are fed to inputs 75 and 76 of a blending unit 73 whose control input 74 is supplied with an interpolation coefficient. The blended signal at the output of blending unit 73 represents an interpolated value, as will be described below. Referring to the time plots of FIGS. 6g and 6h, there are illustrated signals supplied to the blending unit. By interpolating the two signals by interpolation coefficients shown in FIG. 6f, signals shown in FIG. 6i will result. The latter signals are written into one of the stores 11 or 12 at a clock rate $T_k$. Since by interpolating the values $x_5$ and $x_4$ a new value is produced which is not needed, in the arrangement according to FIG. 7 a switch 77 is provided which prevents the feed of the value indicated by hatching in FIG. 6i, to its output and thus to the store. To this end, the control input 74 is connected to the output terminal 43 of the control unit of FIG. 3.

FIG. 6k shows the time-compressed signal which is read out from the store at a clock rate $T_a$. This signal is not processed in the subsequent stages of the system according to FIG. 1, and therefore the interpolator 15 is supplied at its two clock inputs with a clock signal $T_a$ and the applied interpolation coefficient=0.

As mentioned before, the described examples refer to compression or expansion of a video image in horizontal direction. A size change in vertical direction can be in principle made by the same system arrangement, provided that the interpolators do not interpolate consecutive (side-by-side) samples but interpolate superposed samples, that is adjoining samples of two consecutive lines. Furthermore, instead of line stores 11 and 12 (FIG. 1) in this modification a half-image store is necessary. Through the control unit, a horizontal pulse H is applied instead of the sampling clock signal $T_a$ and a vertical pulse V replaces the horizontal pulse H. As instead of signals $T_k$ and $T_e$ (having a frequency corresponding to the sampling rate) at the output of the control unit, there occur signals $T_{kV}$ and $T_{eV}$ having a frequency corresponding to the vertical frequency of the video signal. As the modified values are indicated in brackets in FIG. 3.

To interpolate two superposed image points so as to achieve a vertical compression, the interpolator 10 illustrated in the block diagram in FIG. 7 in which, however, instead of the D-register which delays the signals by a sampling period, a shift register is employed which has as many storing stages as there are samples per line. For example, in the actual device there are used 864 storing stages (8 bits each).

Figure 8:
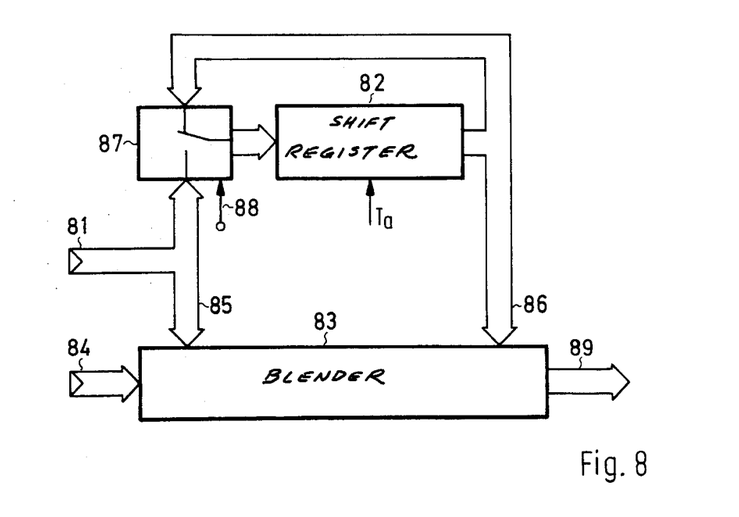
FIG. 8 shows a system diagram of an interpolator for vertical expansion.

An interpolator for the vertical expansion is illustrated in FIG. 8. This interpolator deviates in some respects from the interpolator 15. Output signals from the stores are supplied to input terminal 81, and the interpolation coefficient is supplied to input terminal 84. Shift register 82 has a number of storing stages corresponding to the number of scanning values per line, so that in feeding clock signal $T_a$ a delay of one line will result. As has been already explained in connection with FIG. 5, both the non-delayed signal as well as a signal delayed by one line are applied to inputs 85 and 86 of blending unit 83, and according to the supplied interpolation coefficient an interpolated value is generated and supplied to the output 89. Similarly as in FIG. 4, the samples (for example $x_0$ and $x_1$) are needed during two interpolation periods. Since in this case an interpolation period corresponds to the duration of a video line, in the case of a vertical expansion the samples $x_1, x_2, \ldots,$ shown in FIG. 4 and representing for example the aforementioned 864 samples, it is necessary to repeat the samples of each line. For this purpose, at the input of shift register 82 a switch 87 is provided whose select input 88 is supplied with a pulse D (output 43 of FIG. 3). As long as pulses of signal $T_{eV}$ occur simultaneously with H pulses, the switch 87 is in its lower position. When these pulses are mixing, that is after the occurrence of a pulse illustrated in FIG. 4e, the pulse D brings the switch 87 to its upper position. Reference characters illustrated in FIG. 4 in brackets relate again to a vertical expansion.

Figure 9:
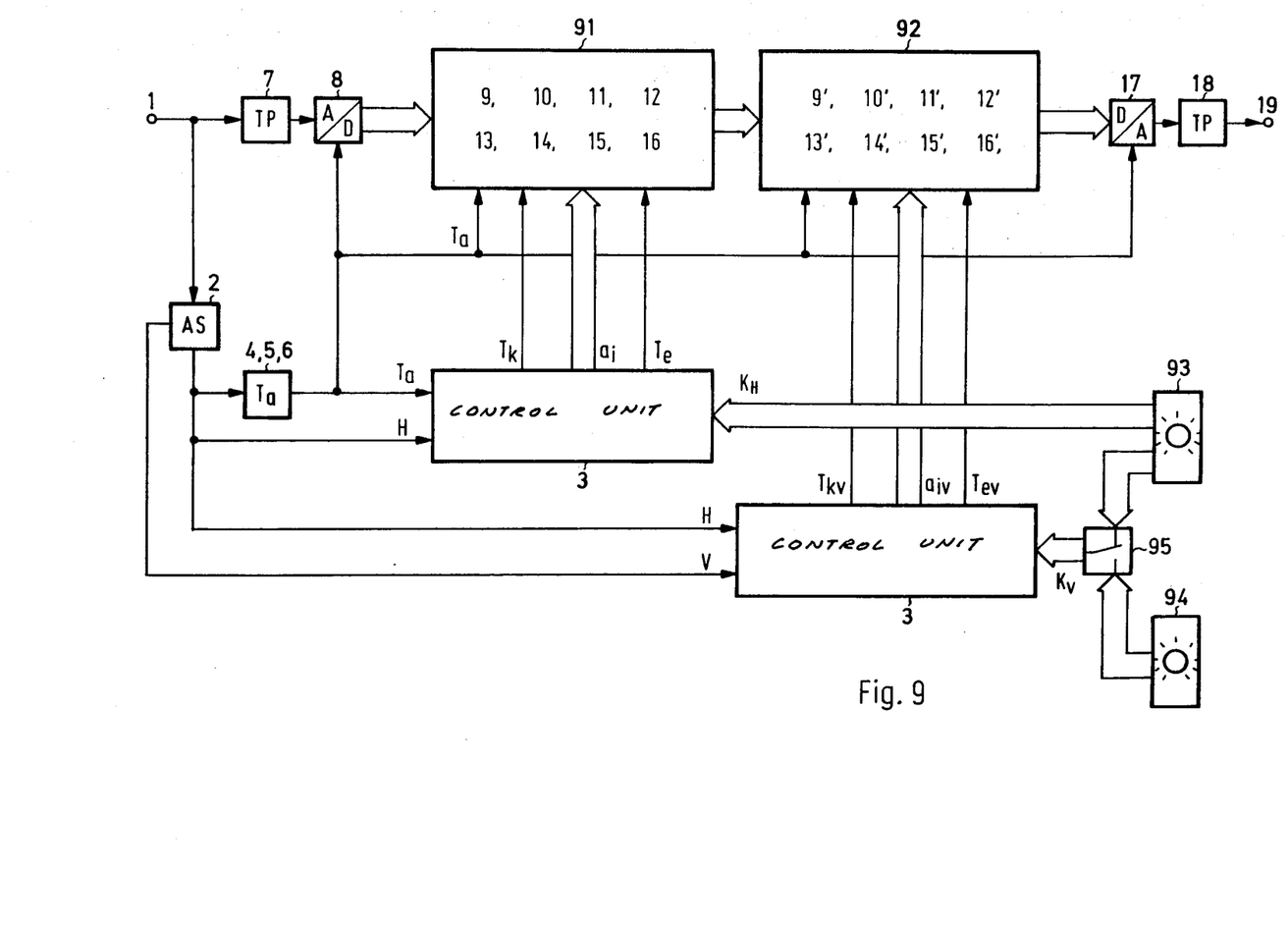
FIG. 9 shows a system diagram for vertical and horizontal compression and expansion of video signals.

FIG. 9 shows a system diagram for changing size of a TV picture in both directions. The signals are again applied to input terminal 1, limited in bandwidth by a lowpass filter 7 and converted by means of an analog/digital converter 8 into digital signals. The generation of a clock signal and of H pulses is similar to that described in the arrangement of FIG. 1, that is by means of an amplitude separator 2 and a PLL circuit 4, 5, 6. In addition, the amplitude separator 2 generates also vertical pulses V. Block 91 includes elements 9–16 of the arrangement according to FIG. 1. That means, it includes those circuit elements which are needed for expansion or compression of the converted digital TV signals in horizontal direction; the unit 91 is controlled by signals $T_k$, $a_i$ and $T_e$ from control unit 3. A clock signal $T_a$ is also supplied. The signals modified for the horizontal direction are supplied to a second expansion and compression unit 92 containing similar elements 9' through 16' as in the preceding unit. The unit 92 cooperates with an additional control unit 3' which is clocked by pulses H and V and supplying to the unit 92 the signals $T_{kV}$, $T_{eV}$ and $a_{iV}$. Upon the modification of the signals corresponding to a vertical change in the size of the picture, the output signals from the block 92 are applied to a digital/analog converter and reconverted into analog signals which are fed via a lowpass filter 18 to the output terminal 19. Compression factors $k_H$ for the horizontal change in size and $k_V$ for the vertical change in size are generated by means of adjustable signal generators 93 and 94. These signal generators can be for example in the form of potentiometers cooperating with analog/digital converters or in the form of corresponding digital generators. Another possibility is to use the so-called incremental signal generators in which a forward/backward counter is provided. Also, counters can be used for continuous time change of a compression factor. The compression factors $k_H$ and $k_V$ of course can be also generated by computers from stored data and according to predetermined algorithms.

The adjustable signal generators 93 and 94 make it possible to influence the factors $k_H$ and $k_V$ separately. In a normal case of an undistorted image imagnification or image reduction, $k_H = k_V$ and the switch 95 can be brought in the illustrated upper position in which both factors are applied via signal generator 93 to respective control units 3 and 3'.

It will be understood that each of the elements described above, or two or more together, may also find a useful application in other types of constructions differing from the types described above.

While the invention has been illustrated and described as embodied in a system for time compression or expansion of black-and white TV signals, it is not intended to be limited to the details shown, since various modifications and structural changes may be made without departing in any way from the spirit of the present invention. For example, when the invention is used for color TV signals, then a device 99 or 92 (FIG. 9) is assigned to each luminance signal or chrominance signal, whereby the chrominance signal would include both color difference signals in a time multiplexer.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A system for time compression or expansion of electrical signals, particularly video signals, in which samples of the signals are interpolated and written into a memory and then read from the memory, comprising first means for producing a continuous first clock signal; second means for producing a second clock signal which has the rate of the continuous first clock signal modified in accordance with predetermined compression or expansion factors by deleting certain pulses in the first clock signal; and means for writing the interpolated samples into the memory under the control of one of said clock signals and reading out the stored samples from the memory under the control of the other clock signal.

2. A system as defined in claim 1, further comprising means for counting pulses of the first clock signal during compression or the second clock signal during expansion from the beginning of a predetermined time interval of the electrical signals; means for producing said compression or expansion factors; means for accumulating consecutive compression or expansion factors in synchronism with consecutive pulses of the second clock signal during compression or the first clock signal during expansion; means for comparing the count of the clock pulses with an integer proportion of the accumulated compression or expansion factors; wherein said second means deletes certain pulses of said first clock signal for producing the second clock signal in response to a disparity of signals being compared in said comparator.

3. A system as defined in claim 1 wherein said writing and reading means comprises a compression interpolator arranged before said memory, said compression interpolator receiving samples under the control of said first clock signal and writing into said memory samples under the control of said second clock signal, whereby said writing and reading means read from said memory compressed samples under the control of said first clock signal.

4. A system as defined in claim 1, wherein said writing and reading means comprises an expansion interpolator arranged after said memory to read samples from said memory under the control of said second clock signal, and means cooperating with said expansion interpolator to output expanded samples under the control of said first clock signal.

* * * * *